United States Patent

Sommer et al.

[15] 3,675,465
[45] July 11, 1972

[54] APPARATUS AND METHOD FOR DIFFERENTIAL THERMAL ANALYSIS

[72] Inventors: Gunter Sommer, 169 Barkston Drive, Randburg; Hans Walter Sander, 84 Shakespeare Road, Johannesburg, both of Republic of South Africa

[22] Filed: Oct. 7, 1969

[21] Appl. No.: 864,491

Related U.S. Application Data

[63] Continuation of Ser. No. 750,623, Aug. 6, 1968, abandoned.

[52] U.S. Cl. ................................................. 73/15 B
[51] Int. Cl. ........................................... G01n 25/00
[58] Field of Search .................................... 73/15

[56] References Cited

UNITED STATES PATENTS

| | | | |
|---|---|---|---|
| 3,285,053 | 11/1966 | Mazieres | 73/15 |
| 3,263,484 | 8/1966 | Watson et al. | 73/15 |
| 3,285,053 | 11/1966 | Mazieres | 73/15 |
| 3,298,220 | 1/1967 | Stomp et al. | 73/15 |
| 3,417,604 | 12/1968 | Bean et al. | 73/15 |
| 3,103,573 | 9/1963 | Neihaus | 219/499 |
| 3,283,560 | 11/1966 | Harden et al. | 73/15 |
| 3,477,274 | 11/1969 | Wald et al. | 73/15 |

OTHER PUBLICATIONS

Brenner, N. et al. Rapid Determination of Specific Heat, 16 (2) Instrument News 1 (1965)
O' Neill, M.J. The Analysis of a Temperature- Controlled Scanning Culorimeter., Analytical
Perkin-Elmer Differential Scanning Colorimeter pp7— 9 Jun. 1966

*Primary Examiner*—Richard C. Queisser
*Assistant Examiner*—Herbert Goldstein
*Attorney*—Karl W. Flocks

[57] ABSTRACT

A method of thermal analysis which includes the steps of controlling the temperatures of at least two units to correspond to a predetermined temperature program, and of measuring the power required by each unit to cause its temperature to correspond to the program.

11 Claims, 7 Drawing Figures

APPARATUS AND METHOD FOR DIFFERENTIAL THERMAL ANALYSIS

This application is a continuation of application Ser. No. 750,623, filed Aug. 6, 1968 by the applicants, Gunter Sommer and Hans Walter Sander, now abandoned.

The present invention relates to a method of thermal analysis and to apparatus therefor.

The technique of differential thermal analysis is employed as a means of detecting the thermal effects associated with chemical or structural changes in materials. In differential thermal analysis a reference sample and a test sample are heated under identical conditions. While heating takes place the physical and/or chemical changes occurring in the test sample are observed. During such heating, various temperature differences between the test sample and the reference sample may occur due to exothermic or endothermic reactions taking place in the test sample.

The different temperatures are recorded on a thermogram which allows the temperature of the test sample or reference sample to be determined. The disadvantage of this system is the appearance of differences in temperature which means deviations from the preset program, e.g. during intrinsic reactions the test sample follows an unpredictable temperature curve which depends on various factors such as sample shape, particle size, weight, and kind of reaction. This leads to the limitation in that only qualitative results are possible.

According to the invention, a method of thermal analysis includes the steps of controlling the temperatures of at least two units to correspond to a predetermined temperature program, and of measuring the power required by each unit to cause its temperature to correspond to the program.

According to another aspect of the invention, a method of thermal analysis includes the steps of simultaneously causing the temperatures of at least two units to correspond to a predetermined temperature program, of detecting temperature differences between the units and the program, of using such temperature differences to cause the temperatures of the units to correspond to the program, and of recording variables relating to the heat content of at least one of the units.

In this specification, "reference unit" or "reference" (as a noun) includes a unit having known thermal properties, and also includes a unit containing a sample having known thermal properties. Also, "unit" includes temperature sensing means and heating means with or without a sample of known or unknown thermal properties. When the unit includes a sample then the sample will be in heat flow relationship with the temperature sensing means and the heating means.

By way of explanation, by "temperature program" is meant a voltage which is the analogue of the temperature of a thermocouple whose temperature is variable in predetermined manner.

One unit may be a reference, and another unit may include a test sample.

Any desired gap may be provided between the temperatures of the units and the program.

The variables recorded may relate to at least one of the following, namely the temperature of a unit, and the temperature difference between any two units, and the difference between electrical power supplied to any two units.

According to another aspect of the invention, in calorimetry there is provided a method which includes the steps of providing two independently heated respectively controlled thermocouples adapted to function as electrical heaters and as temperature sensors, and of measuring the flows of electrical power to each of the thermocouples.

At least one of the thermocouples may also be adapted to function as a test sample holder.

Further according to the invention, a temperature balance analyzer apparatus includes at least two power-varying means for causing the temperatures of at least two units to correspond to a predetermined temperature program; and compensating means for detecting temperature differences between the units and the program, and for causing the power-varying means to act so as to cause the temperatures of the units to correspond to the program.

One unit may be a reference, and another unit may include a test sample.

The apparatus include means for setting any desired temperature gap between the units and the program.

The apparatus may include recording connections for connecting a recorder thereto, for recording variables relating to the heat content of at least one of the units. The variables recorded may relate to at least one of the following, the temperature of any unit, the difference in temperature between any two units, and the difference between electrical power supplied to any two units.

Each unit may include a thermocouple which is adapted to perform the heating and temperature sensing functions of the unit. Any thermocouple may be arranged to hold a sample which may be of a microscopic quantity. Each power-varying means may include a power convertor. Each power-varying means may include a temperature compensating arrangement for changing the rate of current flow to its thermocouple. The temperature program may be provided by a program unit which may be adjustable, and may be operable manually or by a motor.

The causing of the temperatures of each unit to correspond to the program, may be brought about by each compensating means detecting the temperature difference between its unit and the program, and providing a signal to the power-varying means in response to the detected temperature difference. The compensating means may include an amplifier circuit for detecting the said temperature difference, for amplifying the difference, and for providing the signal.

For each thermocouple there may be provided a circuit including a power convertor having a silicon-controlled half-wave rectifier (SCR). A calorimetric method may accordingly include the steps of utilizing a part cycle of current for energizing the thermocouple, and of using a successive part cycle of the current for recording.

The invention will now be described by way of example, with reference to the accompanying schematic drawings.

The structure and function of a temperature balance calorimeter will first be explained with reference to FIGS. 1 to 3 of the drawings. Thereafter, in the light of such description, a variable temperature balance calorimeter will be explained with reference to the remaining drawings.

Figure 1:
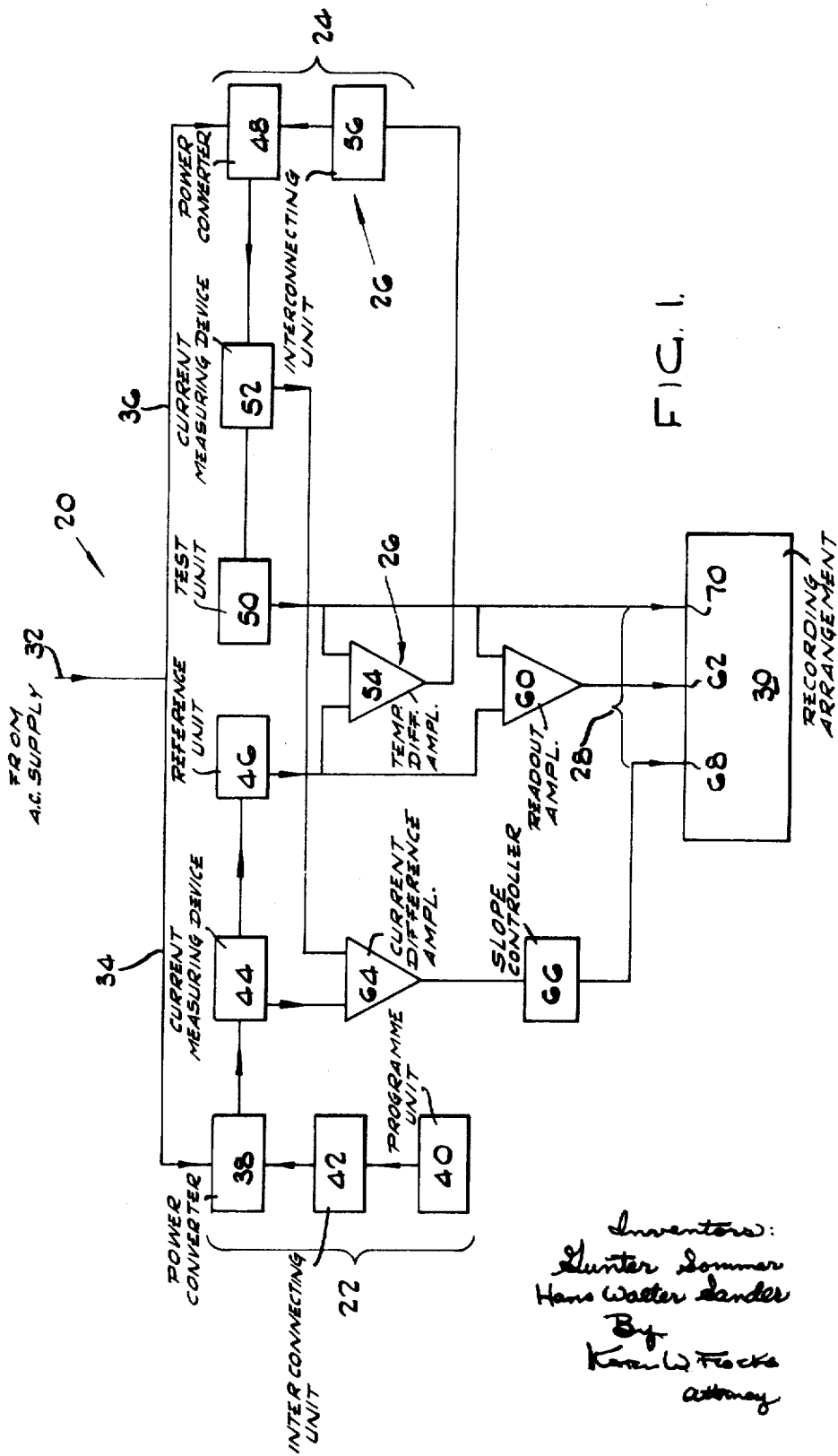
FIG. 1 shows a schematic block diagram of a first embodiment of a thermal analyzer according to the invention, and in the form of a temperature balance calorimeter.

Referring to FIG. 1, there is shown a Temperature Balance Calorimeter, generally indicated by reference numeral 20.

The purpose of the calorimeter is to maintain balanced temperatures between two independently heated, respectively controlled, thermocouples which function as heaters, as temperature sensors, and as sample holders, and to measure the flows of electrical heat to each of the thermocouples.

The calorimeter 20 incorporates a test unit 50 and a reference 46 and a facility for recording the temperature of the test unit, the difference of the temperatures between the test unit and reference, and the difference in power consumption between the test unit and the reference.

The calorimeter therefore includes conveniently five parts, namely;

a. first power-varying means including a circuit directed to the heating of the reference unit, and generally indicated by reference numeral 22;

b. second power-varying means including a circuit directed to the heating of a test unit, and generally indicated by reference numeral 24;

c. a temperature compensating arrangement, generally indicated by reference numeral 26, and having as purpose to equalize the temperature difference existing between the reference and the test unit;

d. recording connection means, generally indicated by reference numeral 28, and having as purpose to supply measured conditions in and between the test unit and the reference, to e. a recording arrangement, generally indicated by reference numeral 30.

Power is supplied to the calorimeter 20 from a mains A.C. supply 32 (e.g. 50 cycles). This power is directed by means of conductors 34 and 36 respectively to the circuit 22 of the reference, and to the circuit 24 of the test unit.

The power convertor 38 controls the power flow at a rate determined by the program unit 40 with the aid of an interconnecting unit 42. The supply current is therefore arranged to flow at a predetermined rate through the current measuring device 44 into the reference unit 46.

The circuit diagram 24 of the test unit 50 includes a power convertor 48 which controls the power flow to the test unit 50 via current measuring device 52, at a rate determined by compensating means in the form of a temperature difference amplifier 54, to which it is joined via the interconnecting unit 56 in the form of an ignition circuit in such a way that temperature balance between the reference unit 46 and the test unit 50 is maintained.

The temperature compensating arrangement 26 includes an amplifier 54 which detects the difference in temperature existing between the reference unit 46 and the test sample contained in the test unit 50. The amplifier 54 commands the interconnecting unit 56 for nullifying the temperature difference appearing on the input of amplifier 54. This is effected by the interconnecting unit 56 changing the current flow from the power convertor 48, i.e. increasing or decreasing the current flow depending on whether a temperature drop or temperature increase takes place in the test unit 50 compared to the reference unit 46.

The recording connection means 28 includes a readout amplifier 60, which is connected in parallel with the amplifier 54. The amplifier 60 detects the temperature difference between the reference unit 46 and the test unit 50 and amplifies the difference, supplying it via channel 62 to the recording arrangement 30 for recordal.

The recording connection means 28 further includes a current difference amplifier 64 for picking up the current difference between the reference current detected in measuring cell 44 and the current detected in measuring cell 52, amplifying this signal and converting the output into a proportional DC signal.

To this DC signal a further signal of the slope controller 66 is added. The differential current signal is then supplied via channel 68 to the recording arrangement 30 for recordal.

Channel 70 of the recording arrangement 30 is directly connected to the test unit 50 for recordal of the temperature existing in the test sample.

Figure 2:
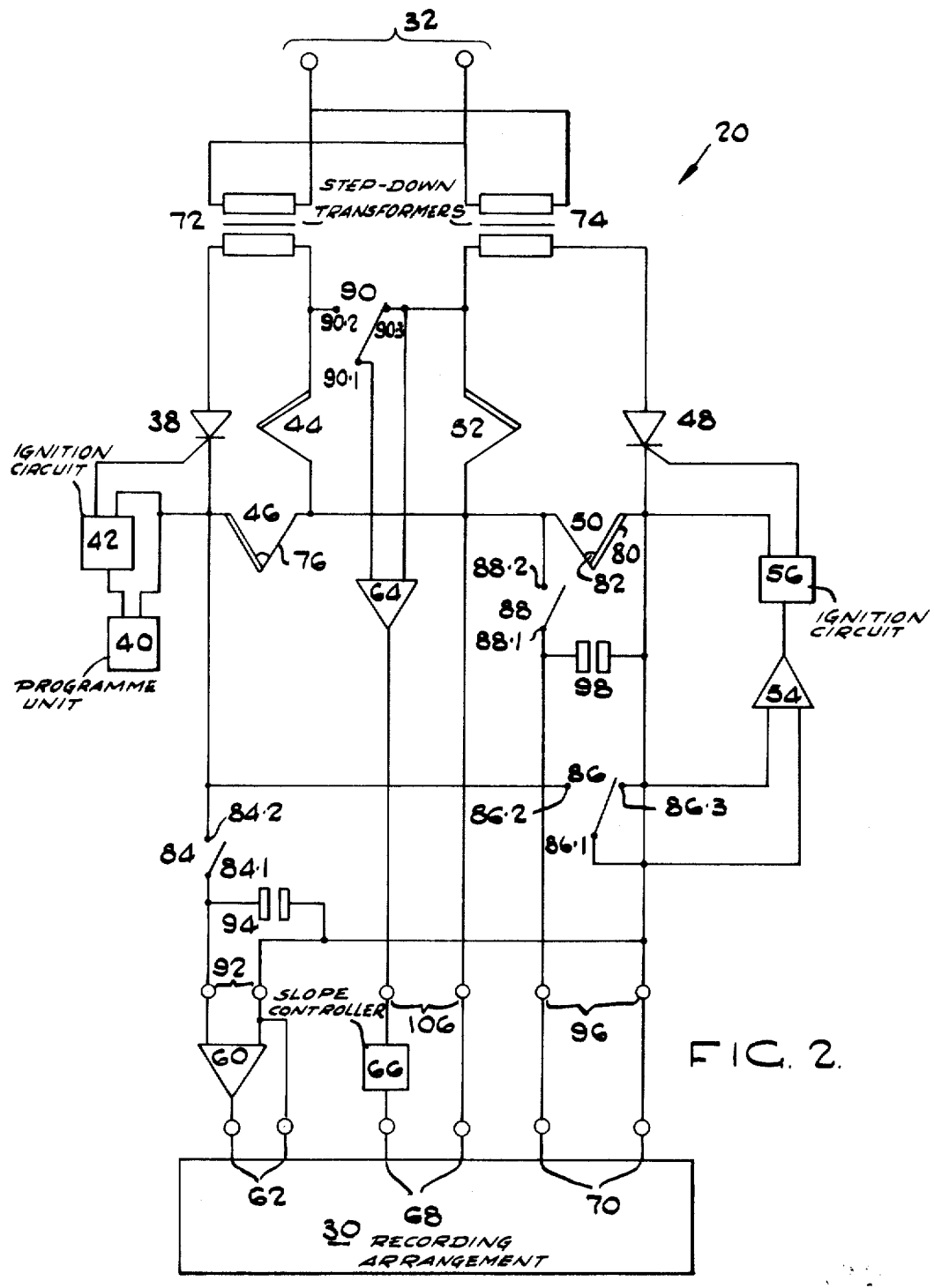
FIG. 2 shows a circuit diagram of the embodiment shown in FIG. 1.

In FIG. 2 a general circuit diagram of the calorimeter 20 is illustrated. The mains 32 are connected to two step-down transformers 72 and 74.

In the secondary circuit of transformer 72 the power convertor 38 is provided in the form of a silicon controlled rectifier. The current measuring device 44 is provided in the form of a vacuum-sealed thermocouple which converts current supplied from the power convertor 38 to a millivolt signal. The reference unit 46 consists of a reference thermocouple 76 near the junction of which a reference sample may be placed.

The secondary circuit of transformer 74 includes the power convertor 48 in the form of a silicon-controlled rectifier and a current-measuring device 52 in the form of a vacuum-sealed thermocouple, which converts the current from the power convertor 48 into the millivolt signal. In this case the test unit 50 also includes a test thermocouple 80 near the junction of which a test sample 82 is placed.

The silicon-controlled rectifier 38 is controlled by the program unit 40 via the ignition circuit 42. The silicon controlled rectifier 48 is controlled by the temperature difference amplifier 54 via the ignition circuit 56.

The heating arrangement for the reference unit 46 and the test unit 50 is such that both elements are heated only during the positive half-cycles, when current flows due to the effect of the silicon-controlled rectifiers 38 and 48 respectively. During that half period when no heating current is flowing, the E.M.F.'s generated by the thermocouples 46, 50 and 44, 52 are measured. This is done by providing switching arrangements 84, 86, 88 and 90. The contacts of these switching arrangements are shown when the heating current is flowing, i.e. when no recordal takes place.

The voltage impulses supplied from contacts 84 are smoothed out by capacitor 94 and supplied to amplifier 60 via terminals 92. Similarly the voltage supplied to the terminals 96 leading to the recording channel 70 on the recording arrangement 30 (see also FIG. 1) is smoothed out by the provision of a capacitor 98. The measurement signal of the test sample temperature is available at terminals 96 via synchronous contacts 88.

To illustrate the operation of the calorimeter it is assumed that a test sample 82 in the thermocouple 80 begins to undergo an exothermic reaction. During the following time interval when no heating current is flowing, the synchronous contacts 86.1 and 86.2 are closed, and the proportional amplifier 54 will detect a deviation in the difference of the E.M.F.'s between the test thermocouple 80 and the reference thermocouple 76.

The output of the amplifier 54 increases and with the aid of the ignition circuit 56, the ignition angle of the SCR 48 in the following half-cycle is increased. The heating current through the test thermocouple 80 is decreased to such an extent that the E.M.F.'s appearing on the input of amplifier 54 are kept balance.

The read-out amplifier 60 which is connected via terminals 92 to synchronous contacts 84.1 and 84.2 will amplify the temperature difference between the reference and the test thermocouple. This enables a supervision of the control deviations. As previously described, the current in the test circuit had to be decreased to keep temperature balance between reference and test sample. This difference in currents due to the control-action of the amplifier 54, will result in a difference of the E.M.F.'s of the vacuum-sealed thermocouples 44 and 52.

In the assumed case of an exothermic reaction the E.M.F. in the test current detector 52 will be smaller than the E.M.F. of the reference current detector 44. This voltage-difference is fed via synchronous contacts 90.1 and 90.2 into the current difference amplifier 64. To the output of the amplifier 64 appearing on terminals 106 a further signal of the slope controller 66 might be added. A deviation of the current read-out in channel 68 of the recorder 30 will result from the exothermic reaction.

Figure 3:
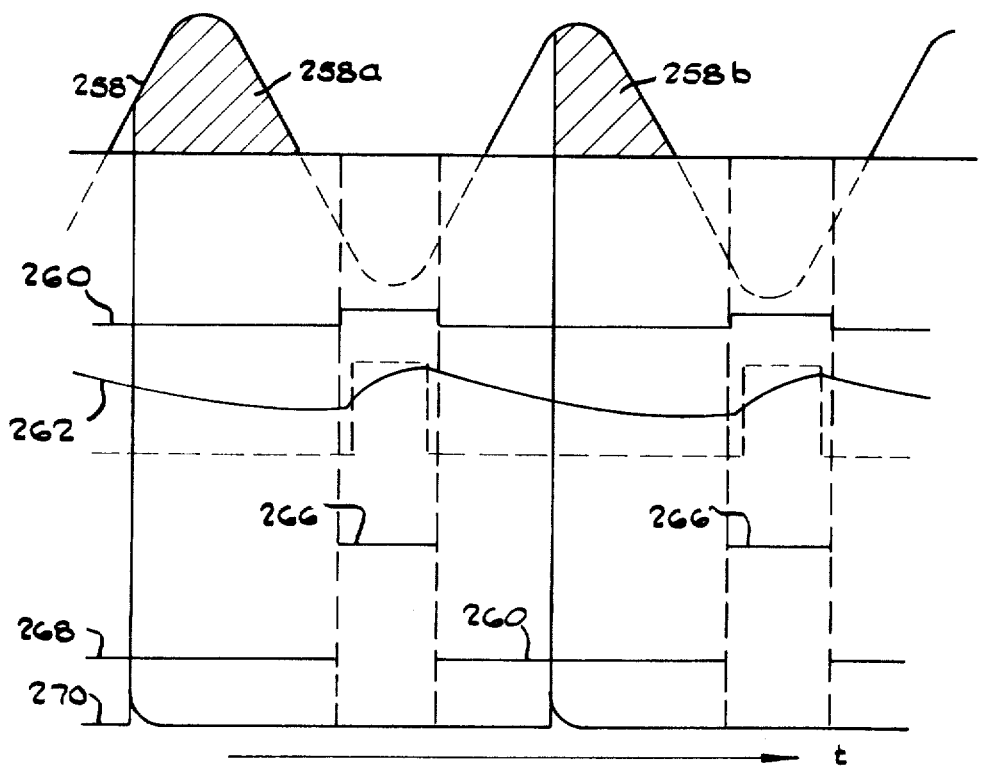
FIG. 3 shows a schematic timing diagram of the embodiment of FIGS. 1 and 2.

In FIG. 3 a schematic timing diagram is illustrated. This diagram shows the relationship between the heat supply and the input signals and output signals of the differential amplifiers and convertors against a time axis $t$. In addition the timing of the synchronous contacts is illustrated.

Curve 258 illustrates the heating supply to the test unit 50. The curve 260 indicates the signals which appear at the input terminals of amplifiers 54, 60 and 64. Curve 262 indicates the output signal of the amplifier 54. Curves 266 show when the contacts 84.1, 84.2; 86.1, 86.2; 88.1, 88.2; and 90.1, 90.2 are closed. Curves 268 show when the synchronous contacts 86.1, 86.3 and 90.1, 90.3 are closed. Curve 270 indicates the ignition pulses from the ignition or interconnecting unit 56.

Referring to curves 266 and 268 it will be noted that when contacts 84.2, 86.2, 88.2, and 90.2 are open, contacts 86.3, 90.3 are closed and vice versa. When contacts 84.2, 86.2, 88.2 and 90.2 are closed, measurement current respectively flow (as indicated by curve 260) for recordal of current flow detected by amplifier 64, for energization of amplifier 60 for recordal of temperature difference between the reference and the test unit and for energization of amplifier 54 respectively.

The ignition pulse 270 coming from the ignition circuit 56 controls the position and duration of the heating current from the power convertor 48 to the test unit as shown in curve 258. For example, the heating current 258a is greater than the heating current 258b.

Figure 4:
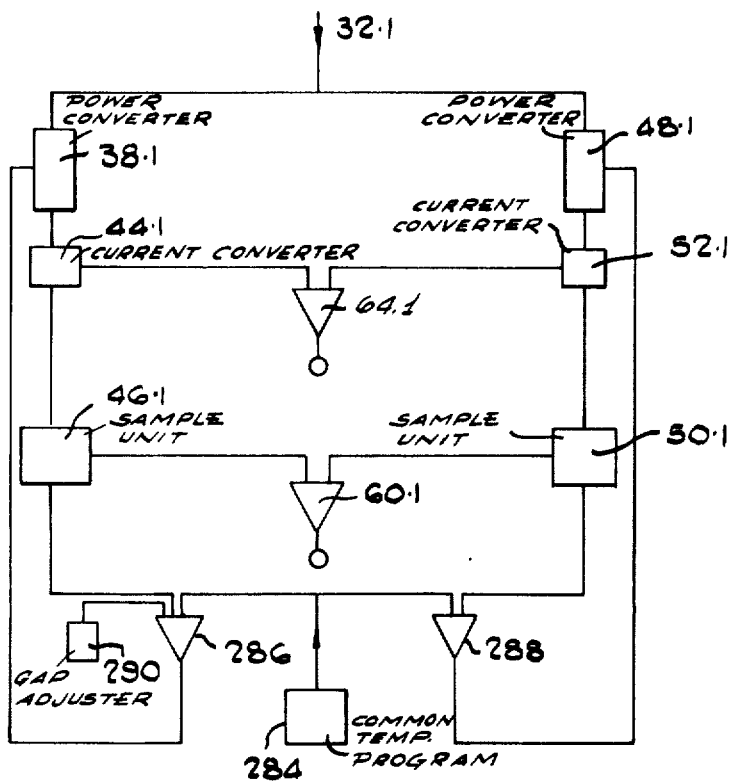
FIG. 4 shows a schematic block diagram of another embodiment of the invention in the form of a variable temperature balance calorimeter.

In FIG. 4 another embodiment of a thermal analyzer for the comparison of two test samples is shown. The two sample units 46.1 and 50.1 are arranged to correspond to a common temperature program 284. The sample units are controlled independently by differential amplifiers 286 and 288 respectively. The control is achieved by regulating the power flow to the sample units. The flow of power into sample unit 46.1 is commanded by differential amplifier 286 and power convertor 38.1. The flow of power into sample unit 50.1 is commanded by differential amplifier 288 and power convertor 48.1. The power is obtained from power supply 32.1. Current read-out amplifier 64.1 amplifies the difference of the signals generated by current converters 44.1 and 52.1. Differential temperature amplifier 60.1 amplifies the difference of the signal generated by the sample units 46.1 and 50.1. With the aid of gap adjuster 290 the temperature of the sample unit 46.1 may be advanced, equalled or retarded relative to the temperature program 284 and therefore also to the temperature of sample unit 50.1.

Figure 5:
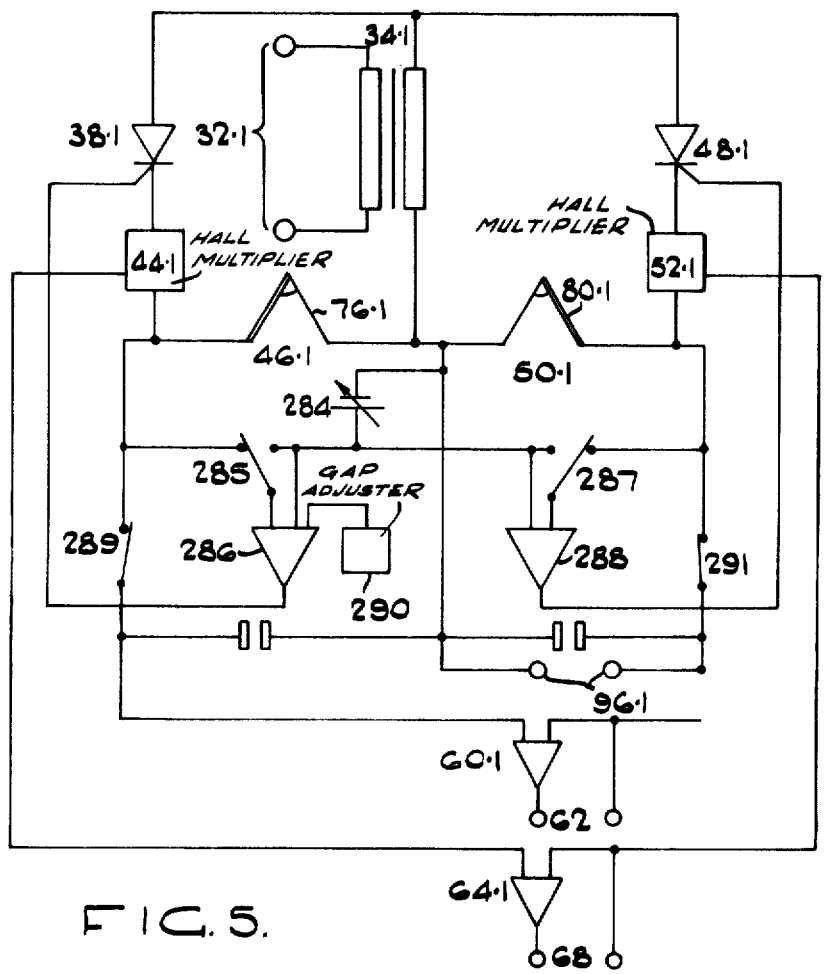
FIG. 5 shows a circuit diagram of the embodiment shown in FIG. 4.

In FIG. 5 a detailed circuit diagram of the Variable Temperature Balance Calorimeter, as described in FIG. 4, is shown.

The mains 32.1 are connected to step down transformer 34.1. In the secondary circuits of transformer 34.1 power convertors 38.1 and 48.1 are provided in the form of silicon controlled rectifiers (SCR). The current measuring devices 44.1 and 52.1 are provided in the form of Hall multipliers which convert the currents supplied from the power convertors 38.1 and 48.1 into millivolt signals. These signals are proportional to the square currents.

Silicon controlled rectifiers 38.1 and 48.1 are controlled by amplifiers 286 and 288 respectively. the input of amplifiers 286 and 288 is the difference between the voltage generated by the program 284 and the EMF's generated by the thermocouples 76.1 and 80.1 respectively. With the aid of gap adjuster 290 a further signal is added to the amplifier 286 which results in a temperature gap between sample units 46.1 and 50.1. The synchronous contacts 285, 287, 289 and 291, operate in similar fashion to those described with reference to FIGS. 2 and 3.

FIG. 4 shows the positions of the synchronous contacts during the measuring part of the period, i.e. when no heating current is flowing.

Numeral 60.1 indicates the read-out amplifier for the temperature difference which is the temperature gap between the two sample units. Numeral 64.1 indicates the read-out amplifier for the difference of the square currents to the sample units. Terminals 96.1 are provided for the temperature measurement of sample unit 50.1.

For better understanding of the advantages of such an arrangement over the prior art known to the applicants, the following example is given. To measure freezing point depression, assume that a pure sample is placed in one sample holder and an impure sample is placed in the other sample holder. In the said prior art the manipulation of time and rate of temperature change as a measure of freezing point depression gives any reasonable accuracy if small rates of temperature change are chosen. In the new arrangement above described, it is possible by the variation of the temperature gap, to achieve simultaneous starting points of crystallization. The temperature difference read-out is therefore an expanded temperature indicator of the freezing point depression as a result from the gap adjustment. The power difference read-out enables quantitative comparison between pure and impure samples.

Figure 6:
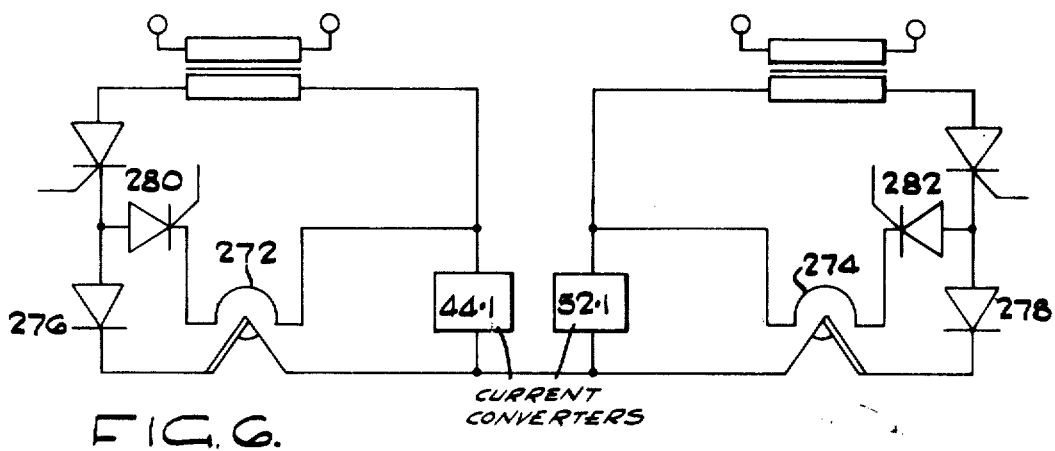
FIG. 6 shows a heat shield arrangement.

Referring to FIG. 6, a schematic view of a heat shield arrangement is illustrated. Due to the heat loss from the sample, indications of exothermic reactions are relatively smaller than indications of endothermic reactions. A heat shield increases the sensitivity of the apparatus. Referring to FIG. 6, a modification for including the heat shields 272 and 274 is shown. Two diodes 276 and 278 are inserted to prevent short circuits of the measuring signals. Two S.C.R.'s 280 and 282 allow two filaments 272, 274, acting as heat shields, to correspond to a selectable temperature program which may be that of the thermocouples. A heat shield may be in the form of a thermocouple.

In the Temperature Balance Calorimeter described in FIG. 2, a simplified power read-out is used which employs the principle of converting current to a millivolt signal by means of thermo-converters. Therefore, the read-out represents the difference of the currents to the reference and the test unit.

If, for instance during a reaction, addition of thermal energy is necessary to maintain the required temperature in the sample, the equivalent amount of electrical power must be supplied. This energy is $I^2 \times R \times k$. $Rk$ is a reproducible instrumental factor. Values can be found by calibration with known sample materials. $I^2$ must be measured. This can be done with Hall multipliers where the generated Hall voltage signal is proportional to the squared current. These current-measuring devices are incorporated in the Variable Temperature Balance Calorimeter as described in FIG. 5 at 44.1 and 52.1.

Figure 7:
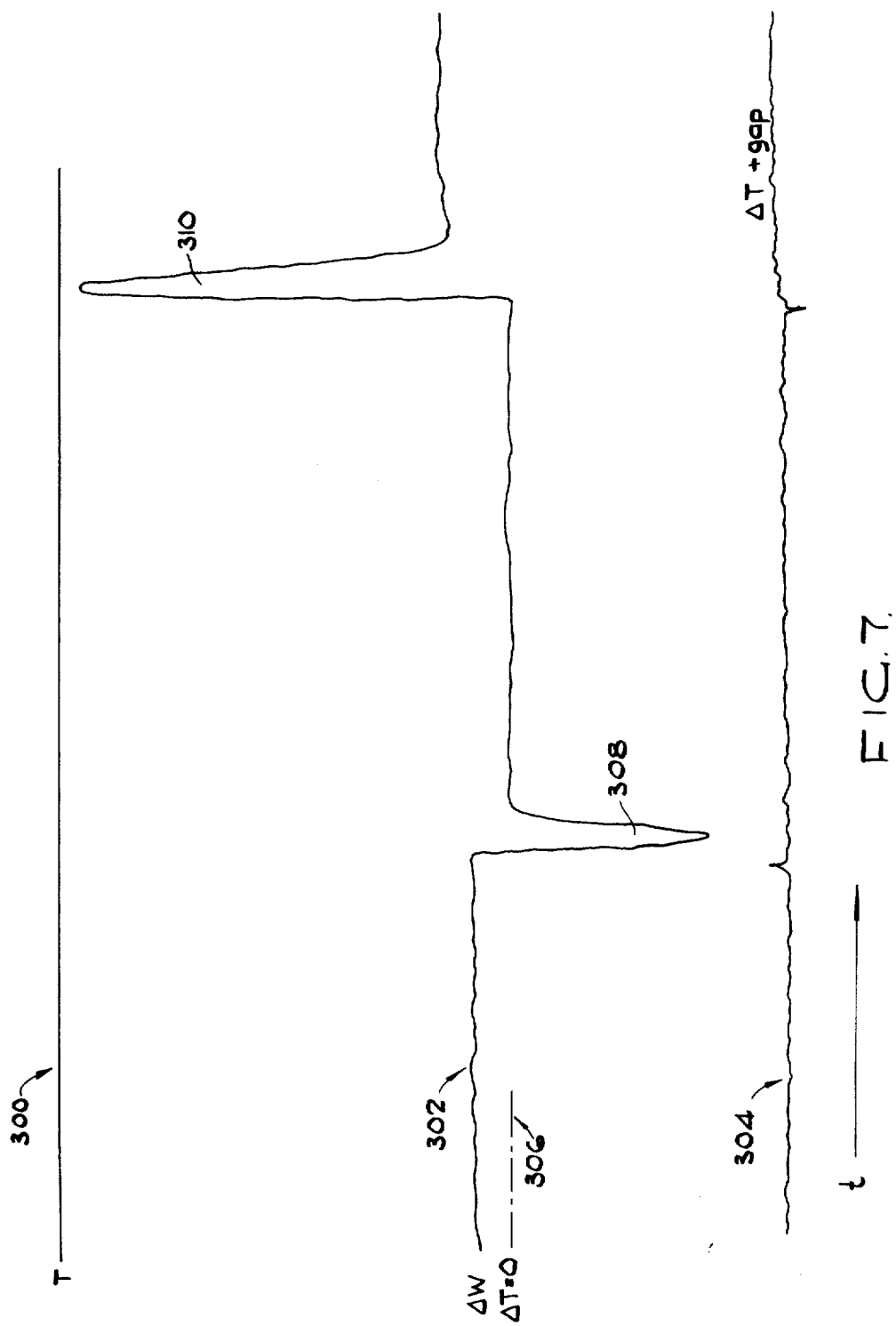
FIG. 7 shows a recording obtained with the use of the embodiment of FIGS. 4 and 5.

FIG. 7 illustrates a recording obtained with the use of a Variable Temperature Balance Calorimeter when comparing two samples differentially.

Curve 300 illustrates the absolute temperature of the sample that follows the temperature program directly (T).

Curve 302 illustrates the differential power read-out ($\Delta W$).

Curve 304 illustrates the differential temperature read-out ($\Delta T$).

Curve 306 is the reference line for zero temperature gap.

Peak 308 represents the thermal energy released (enthalpy) of the exothermic reaction of a 150 $\mu$gr sample of $Na_2SO_4$.

Peak 310 represents the thermal energy released (enthalpy) of the exothermic reaction of a 350 $\mu$gr sample of $Na_2SO_4$.

Corresponding to literature, the amount of energy released is 39.91 cal/gr at 884° C. Therefore peak 308 represents 0.006 calories and peak 310 represents 0.014 calories.

To illustrate the gap adjustment, these two samples were programmed with a constant gap of 2.1° C with a cooling rate of 6° C/min.

As the samples crystallize at the same temperature the resulting peaks appear in different positions on the time axis. The temperature gap read-out is recorded on the differential temperature recording. From this recording it can be seen that if the fusion of the one sample would have been depressed, by impurity, by 2.1° C the peaks would have appeared at the same position on the time axis. An application of this technique could be the determination of melting point depression.

The invention extends also to a calorimetric method which includes the steps of using at least two units, each of which includes a thermocouple adapted to perform the heating and temperature sensing functions of the unit, of causing the thermocouples to correspond to a predetermined temperature program, and of shielding each thermocouple by a shield arranged to correspond to the temperature of the thermocouple.

Furthermore, also in calorimetry, the invention extends to a method of measuring freezing point depression, which includes the use of a plurality of samples, and of achieving simultaneous starting points of crystallization for the samples by controlling the temperature gaps between each of them and a predetermined temperature program.

Freezing point depression is of importance in the study of material where changes in phase take place. A pure material in liquid phase when cooled, will always freeze at a definite temperature provided that super cooling does not take place. A sample of the same material, but which is slightly impure, will have a lower freezing point. This is known as freezing point depression. The degree of freezing point depression can be a measure of the impurities in the sample.

Freezing point depression is much used in preparing phase diagrams in metallurgy, and also in high temperature chemistry.

What we claim is:

1. A method of differential thermal analysis which includes the steps of causing the temperature of each of at least two units to correspond over a time period to a predetermined temperature program, of detecting the temperature differences within the said time period between each unit and the program, of using such temperature difference to vary power supplied to each said unit to cause the temperature of each said unit to correspond to the program, of recording the temperature of any unit, and of comparing the electrical power supplied to any two units.

2. A method of differential thermal analysis which includes the steps of causing the temperature of each of at least two units to correspond over a time period to a predetermined temperature program, of detecting the temperature differences within the said time period between each unit and the program, of using such temperature difference to vary power supplied to each said unit to cause the temperature of each said unit to correspond to the program, of recording the temperature difference between any two units, and of comparing the electrical power supplied to any two units.

3. A method of differential thermal analysis which includes the steps of causing the temperature of each of at least two units to correspond over a time period to a predetermined temperature program, of detecting the temperature differences within the said time period between each unit and the program, of using such temperature difference to vary power supplied to each said unit to cause the temperature of each said unit to correspond to the program, and of comparing the electrical power supplied to any two units.

4. Temperature balance analyser apparatus, operable in accordance with a program of temperature variation over a time period, which includes at least two units of equipment with at least one of said units containing a sample during said time period; power-varying means for causing the temperature of each of said at least two units to correspond individually during said time period to a predetermined temperature program; said power-varying means including means to supply said predetermined temperature program to said power-varying means; compensating means for each unit for detecting the temperature difference between each said unit and the program, and for causing the power-varying means of each said unit to act so as to cause the temperature of each said unit to correspond to the program; and output means for obtaining measurement information relating to the electrical power supplied to any two units.

5. Apparatus according to claim 4, and which includes means for setting any desired temperature gap between any of the units and the program.

6. Apparatus according to claim 4, in which said output means includes means to record a variable related to the temperature of any unit.

7. Apparatus according to claim 4, in which said output means includes means to record a variable related to the difference in temperature between any two units.

8. Temperature balance analyser apparatus, which includes power-varying means for causing the temperatures of each of at least two units to correspond individually to a predetermined temperature program; and compensating means for each unit for detecting the temperature difference between each said unit and the program, and for causing the power-varying means of each said unit to act so as to cause the temperature of each said unit to correspond to the program; each unit including a thermocouple, and the apparatus including circuitry means connected to said thermocouple to enable the thermocouple to perform both heating and temperature sensing functions of the unit, and output means for obtaining measurement information relating to the electrical power supplied to any two units.

9. Apparatus as claimed in claim 8, and which includes a heat shield for each thermocouple, and means for causing each heat shield to correspond to the temperature of its thermocouple.

10. Apparatus as claimed in claim 8, in which each thermocouple forms part of a circuit including a power converter having a silicon controlled halfwave rectifier connected to each said thermocouple, and in which there are provided means for utilizing part only of a cycle of current for energizing the thermocouple for heating purposes, and for utilizing another part of the cycle for determining the temperature of the thermocouple.

11. A method of differential thermal analysis which includes the steps of controlling the temperature of one unit over a time period so that its temperature corresponds within the said time period to a predetermined temperature program by varying the power supplied to said unit, of controlling the temperature of at least one other unit so that its temperature is offset by a predetermined constant temperature gap from the said temperature program by varying the power supplied to said other unit, and of comparing the power so supplied to the units.

* * * * *

UNITED STATES PATENT OFFICE
CERTIFICATE OF CORRECTION

Patent No. 3,675,465          Dated July 11, 1972

Inventor(s) Gunter SOMMER et al

It is certified that error appears in the above-identified patent and that said Letters Patent are hereby corrected as shown below:

Assignee: National Institute of Metallurgy

Signed and sealed this 3rd day of April 1973.

(SEAL)
Attest:

EDWARD M. FLETCHER, JR.          ROBERT GOTTSCHALK
Attesting Officer                Commissioner of Patents